(12) United States Patent
Huang et al.

(10) Patent No.: US 10,845,873 B2
(45) Date of Patent: Nov. 24, 2020

(54) EYE TRACKING MODULE FOR VIDEO GLASSES

(71) Applicant: BEIJING 7INVENSUN TECHNOLOGY CO., LTD., Beijing (CN)

(72) Inventors: Tongbing Huang, Beijing (CN); Junsheng Li, Beijing (CN)

(73) Assignee: BEIJING 7INVENSUN TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/322,933

(22) PCT Filed: Jul. 14, 2017

(86) PCT No.: PCT/CN2017/092951
§ 371 (c)(1),
(2) Date: Feb. 2, 2019

(87) PCT Pub. No.: WO2018/028379
PCT Pub. Date: Feb. 15, 2018

(65) Prior Publication Data
US 2019/0187789 A1    Jun. 20, 2019

(30) Foreign Application Priority Data
Aug. 10, 2016  (CN) .................. 2016 2 0864385 U (51) Int. Cl.
*G09G 5/00* (2006.01)
*G06F 3/01* (2006.01)
(Continued)

(52) U.S. Cl.
CPC ......... *G06F 3/013* (2013.01); *G02B 27/0093* (2013.01); *G06F 3/01* (2013.01); *G06K 9/00* (2013.01); *G06K 9/00597* (2013.01)

(58) Field of Classification Search
USPC ............... 345/156, 419, 8, 633; 382/103
See application file for complete search history.

(56) References Cited

U.S. PATENT DOCUMENTS

| | | |
|---|---|---|
| 6,448,944 B2 | 9/2002 | Ronzani et al. |
| 7,697,750 B2 * | 4/2010 | Simmons ............... G02B 27/46 |
| | | 345/419 |

(Continued)

FOREIGN PATENT DOCUMENTS

| | | |
|---|---|---|
| CN | 203164514 U | 8/2013 |
| CN | 104094280 A | 10/2014 |

(Continued)

OTHER PUBLICATIONS

"Combining Eye Tracking with Optimizations for Lens Astigmatism in modern wide-angle HMDs" published online on Mar. 29, 2014 retrieved from https://perceptual.mpi-inf.mpg.de/files/2016/01/Pohl16_VR.pdf on Nov. 18, 2019.

(Continued)

*Primary Examiner* — Thuy N Pardo
(74) *Attorney, Agent, or Firm* — Gang Yu (57) ABSTRACT

An eye tracking module for video glasses includes: at least two infrared light sources, at least one image sensor assembly, an infrared light filter component and a tracking module housing; fixing members are provided on the tracking module housing, and include an infrared light source fixing member, an image sensor assembly fixing member and a connector; the infrared light source fixing member and the image sensor assembly fixing member are in detachably fixed connection or non-detachably fixed connection with the tracking module housing; and the connector is in detachably fixed connection with the tracking module housing. The eye tracking module has the advantages of simple structure, (Continued)

small occupied space, high eye tracking precision, and flexibility and convenience in use.

11 Claims, 8 Drawing Sheets

(51) Int. Cl.
*G06K 9/00* (2006.01)
*G02B 27/00* (2006.01)

(56) References Cited

U.S. PATENT DOCUMENTS

| | | | |
|---|---|---|---|
| 10,564,423 B2 * | 2/2020 | Samec | A61B 3/08 345/633 |
| 2010/0110368 A1 | 5/2010 | Chaum | |
| 2010/0149073 A1 * | 6/2010 | Chaum | G02B 27/0093 345/8 |
| 2012/0019645 A1 | 1/2012 | Maltz | |
| 2013/0011485 A1 | 1/2013 | Hua et al. | |
| 2013/0083011 A1 * | 4/2013 | Geisner | G06T 19/006 345/419 |
| 2013/0194389 A1 | 8/2013 | Vaught et al. | |
| 2013/0328762 A1 * | 12/2013 | McCulloch | G02B 27/017 345/156 |
| 2014/0002444 A1 * | 1/2014 | Bennett | G06F 3/012 345/419 |
| 2014/0111632 A1 * | 4/2014 | Huang | G06F 3/013 348/78 |
| 2014/0285429 A1 * | 9/2014 | Simmons | G02B 27/0179 345/156 |
| 2015/0009574 A1 | 1/2015 | Liesecke et al. | |
| 2016/0116745 A1 | 4/2016 | Osterhout et al. | |
| 2017/0000342 A1 * | 1/2017 | Samec | G06T 19/006 345/8 |
| 2020/0041797 A1 * | 2/2020 | Samec | A61B 3/022 345/156 |
| 2020/0081256 A1 * | 3/2020 | Samec | A61B 3/0025 345/633 |
| 2020/0089319 A1 * | 3/2020 | Popovich | G06F 3/013 382/103 |

FOREIGN PATENT DOCUMENTS

| | | |
|---|---|---|
| CN | 104133299 A | 11/2014 |
| CN | 105487229 A | 4/2016 |
| CN | 105718046 A | 6/2016 |
| CN | 206178658 U | 5/2017 |
| EP | 2547249 B1 | 1/2016 |
| JP | 09-043680 A | 2/1997 |
| JP | 2014059533 A | 4/2014 |
| JP | 2014532542 A | 12/2014 |
| JP | 2016115965 A | 6/2016 |

OTHER PUBLICATIONS

AU first Office Action dated Nov. 25, 2019 re: Application No. 2017310912, pp. 1-5.

Extended European search report dated Mar. 20, 2020 re: Application No. 17838509.2, pp. 1-7.

JP first Office Action dated Mar. 16, 2020 re: Application No. 2019-527938, pp. 1-3.

* cited by examiner

EYE TRACKING MODULE FOR VIDEO GLASSES

TECHNICAL FIELD

The present disclosure relates to the technical field of eye tracking, and particularly relates to an eye tracking module for video glasses.

BACKGROUND

Eye tracking is a technology for getting a present 'gazing direction' of a subject by using various detection means, such as machinery, electrons and optics. With the rapid development of a computer vision, an artificial intelligence technology and a digital technology, the eye tracking technology has become a hotspot research field at present, and has an extensive application in the man-machine interaction field, for example, the eye tracking technology may be applied to vehicle auxiliary driving, virtual reality and cognitive disorder diagnosis and the like.

A present eye tracking device generally has the defects of complicated structure, large occupied space and limited eye tracking precision and the like.

SUMMARY

In allusion to the existing defects in the related technology, the present disclosure provides an eye tracking module for video glasses, and is capable of effectively solving the above problems.

The technical solutions adopted by the present disclosure are as follows.

An embodiment of the present disclosure provides an eye tracking module for video glasses, including: at least two infrared light sources, at least one image sensor assembly, an infrared light filter component and a tracking module housing.

The infrared light sources are fixedly arranged in a lateral frontal region of an eye, are located at an edge or an outside of a visual angle of the video glasses, and are configured to emit infrared light to an eye; and the eye reflects the infrared light so as to form an eye reflection light path.

The image sensor assembly is fixedly arranged in the lateral frontal region of the eye and is located at the edge or the outside of the visual angle of the video glasses; and the image sensor assembly is disposed on the eye reflection light path and is configured to directly collect an eye image.

The infrared light filter component is disposed on a transmission light path between the image sensor assembly and the eye.

Fixing members are provided on the tracking module housing, and include an infrared light source fixing member, an image sensor assembly fixing member and a connector.

The infrared light source fixing member is configured to fix the infrared light sources on the tracking module housing.

The image sensor assembly fixing member is configured to fix the image sensor assembly on the tracking module housing.

The connector is configured to fix the eye tracking module on a video glasses housing.

The infrared light source fixing member and the image sensor assembly fixing member are in detachably fixed connection or non-detachably fixed connection with the tracking module housing; and the connector is in detachably fixed connection with the tracking module housing.

In an exemplary embodiment, the fixing members further include a lens fixing member, configured to fix a lens on the tracking module housing; and the lens fixing member is in detachably fixed connection or non-detachably fixed connection with the tracking module housing.

In an exemplary embodiment, the detachably fixed connection is threaded connection or pin connection or elastically deformed connection or lock catch connection or plug-in connection; and the non-detachably fixed connection is welding or bonding or riveting.

In an exemplary embodiment, the eye tracking module further includes a lens; the lens is fixedly disposed between a transmission light path between the eye and a display screen; an outer edge of the lens is located at an edge or an outside of the visual angle of the video glasses; and the lens is configured to assist adjustment of a focal distance.

In an exemplary embodiment, the lens is fixedly disposed on a transmission light path between the eye and the infrared light sources; or, the lens is fixedly disposed on a transmission light path between the infrared light sources and the display screen.

In an exemplary embodiment, an antireflection coating is plated on a side and a surface of the lens, and is configured to eliminate stray light.

In an exemplary embodiment, the lens is a vision correction lens.

In an exemplary embodiment, the vision correction lens is a convex lens or a concave lens.

In an exemplary embodiment, each of the infrared light sources is disposed in front of an ocular lens of the video glasses.

In an exemplary embodiment, a lampshade is further disposed around the infrared light sources.

In an exemplary embodiment, the infrared light source fixing member and/or the lampshade are made of a light-tight material, and are configured to limit a range of an irradiation angle of each of the infrared light sources to be not smaller than 10° and not greater than 180°, and prevent a light emitted by the infrared light sources from reflecting or directly irradiating to the ocular lens.

In an exemplary embodiment, the infrared light filter component is integrated to an inside or a surface of the image sensor assembly.

Or, the tracking module housing is further provided with an infrared light filter component fixing member; and the infrared light filter component is fixed on the tracking module housing via the infrared light filter component fixing member.

The eye tracking module for the video glasses provided by the present disclosure has the following advantages.

The eye tracking module has the advantages of simple structure, small occupied space, high eye tracking precision, flexible assembly and convenience in use.

NUMERALS IN THE DRAWINGS 1, infrared light source; 2, image sensor assembly; 3, lens; 4, display screen; 5, ocular lens; 6, tracking module housing; 7, eye; 8, video glass housing; 11, infrared light filter component; 6-1, infrared light source fixing member; 6-2, image sensor assembly fixing member; 6-4, connector; 6-3, lens fixing member; 1-1, lampshade; 9, master control unit; 10, intelligent device.

DETAILED DESCRIPTION OF THE EMBODIMENTS

The present disclosure will be described below in detail in combination with accompanying drawings.

Some embodiments of the present disclosure provides an eye tracking module for video glasses, which may be installed in a virtual reality glasses device, through a unique design of an interior structure of the virtual reality glasses, the eye tracking is achieved, so while a user watches a display terminal positioned in front of the glasses by wearing the glasses, the display terminal may be operated and controlled on the basis of an eye tracking technology, and the functions of man-machine interaction and fixation point rendering and the like are realized.

Figure 6:
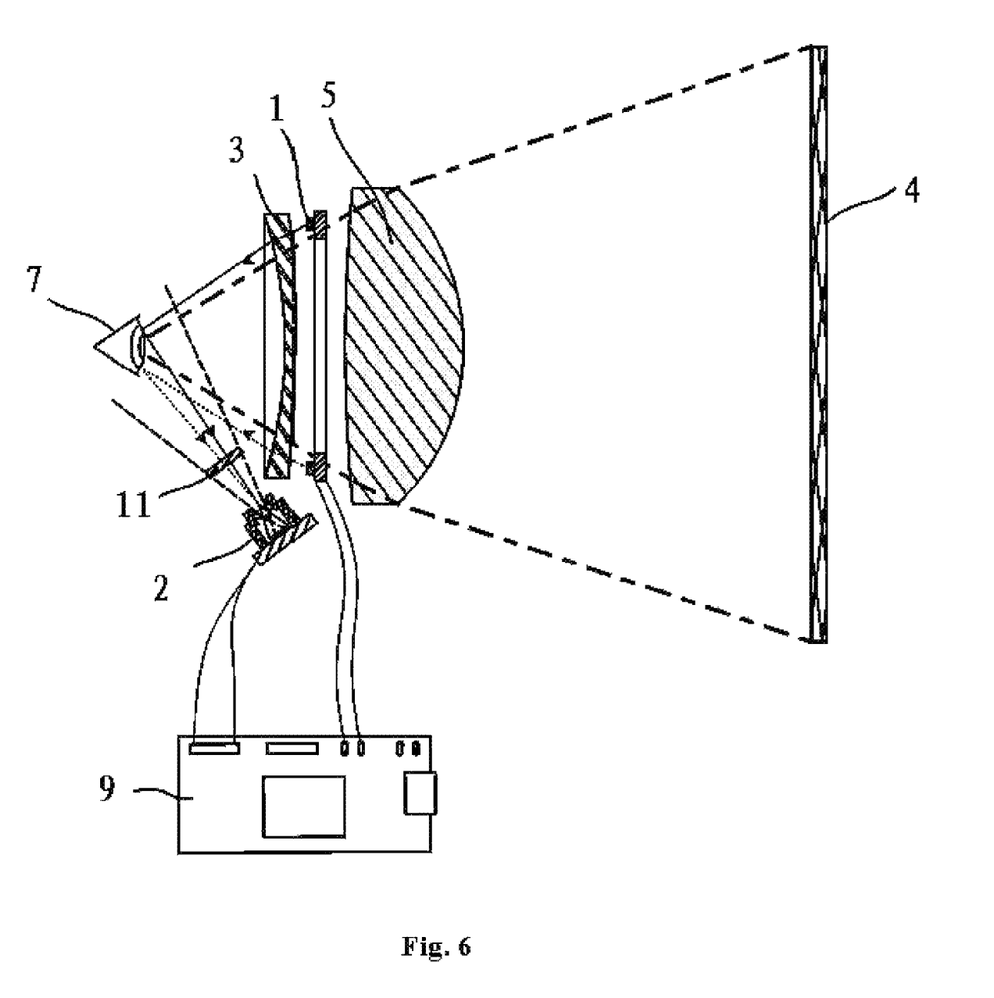
FIG. 6 is a schematic diagram of an imaging light path when a concave lens is adopted by a lens in a single-eye tracking module provided by an embodiment of the present disclosure.
Figure 7:
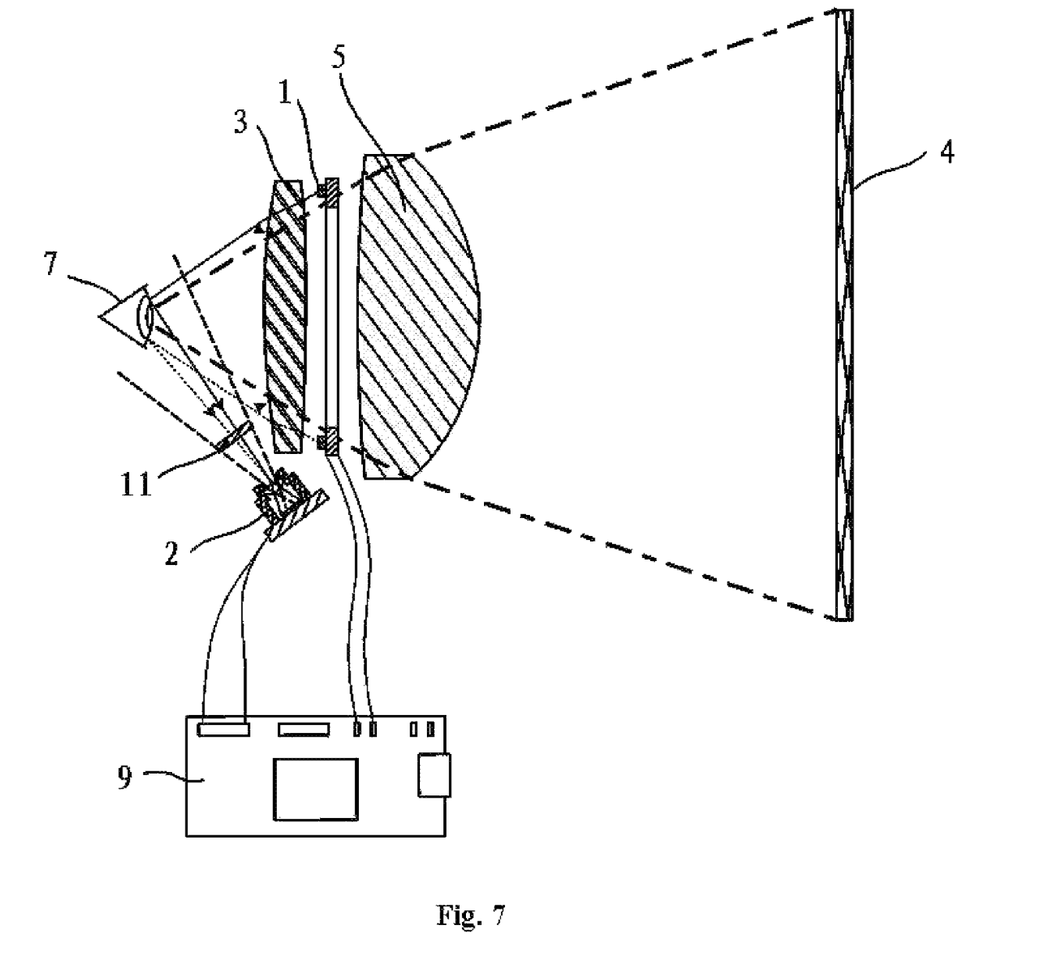
FIG. 7 is a schematic diagram of an imaging light path when a convex lens is adopted by a lens in a single-eye tracking module provided by an embodiment of the present disclosure.
Figure 8:
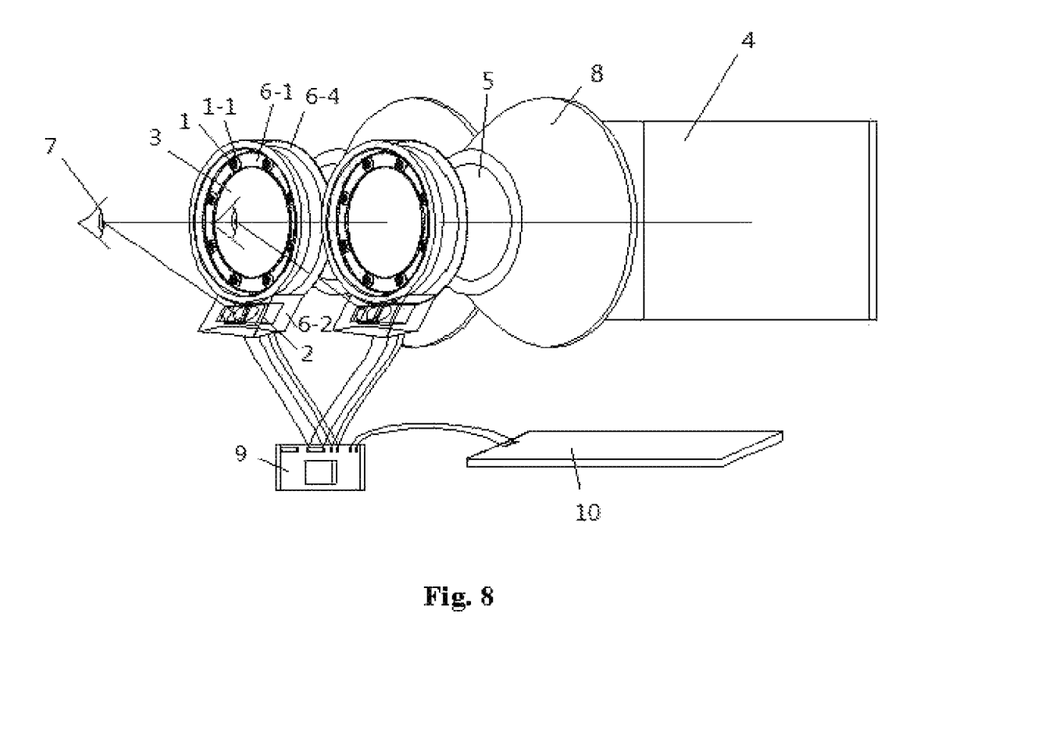
FIG. 8 is a three-dimensional structural schematic diagram of a double-eye tracking module provided by an embodiment of the present disclosure.

The eye tracking module for the video glasses provided by the present disclosure may be a single-eye tracking module or a double-eye tracking module. FIG. 1 to FIG. 7 respectively shows a structural schematic diagram of the single-eye tracking module, and FIG. 8 is a structural schematic diagram of the double-eye tracking module. Because the double-eye tracking module is a product formed by integrating two single-eye tracking modules together, a realizing principle of the double-eye tracking module is basically the same as that of the single-eye tracking module, so, for convenient description, the single-eye tracking module is used as an example for description below.

In combination with FIG. 1 to FIG. 7, the eye tracking module for the video glasses provided by the present disclosure includes at least two infrared light sources 1, at least one image sensor assembly 2, an infrared light filter component 11 and a tracking module housing 6.

The infrared light sources 1 are fixedly arranged in a lateral frontal region of an eye 7, are located at an edge or an outside of a visual angle of the video glasses, and are configured to emit infrared light to the eye 7; and the eye 7 reflects the infrared light so as to form an eye reflection light path.

The image sensor assembly 2 is fixedly arranged in the lateral frontal region of the eye and is located at the edge or the outside of the visual angle of the video glasses; and the image sensor assembly 2 is disposed on the eye reflection light path and is configured to directly collect an eye image.

The infrared light filter component 11 is disposed on a transmission light path between the image sensor assembly 2 and the eye 7. Herein, the infrared light filter component is disposed in front of the image sensor assembly 2, so that only light rays emitted by the infrared light sources can pass through an imaging lens, the influence of light rays having other wavelengths on an image can be eliminated, and the imaging quality is improved.

Figure 1:
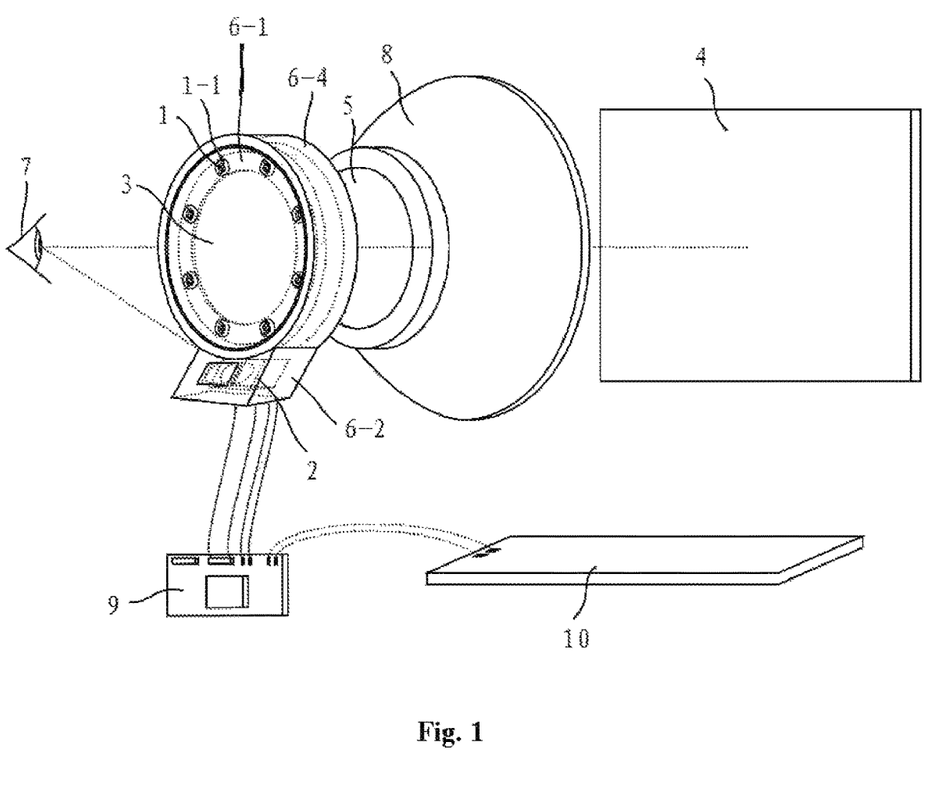
FIG. 1 is a schematic diagram of an assembly relationship of a single-eye tracking module provided by an embodiment of the present disclosure.
Figure 2:
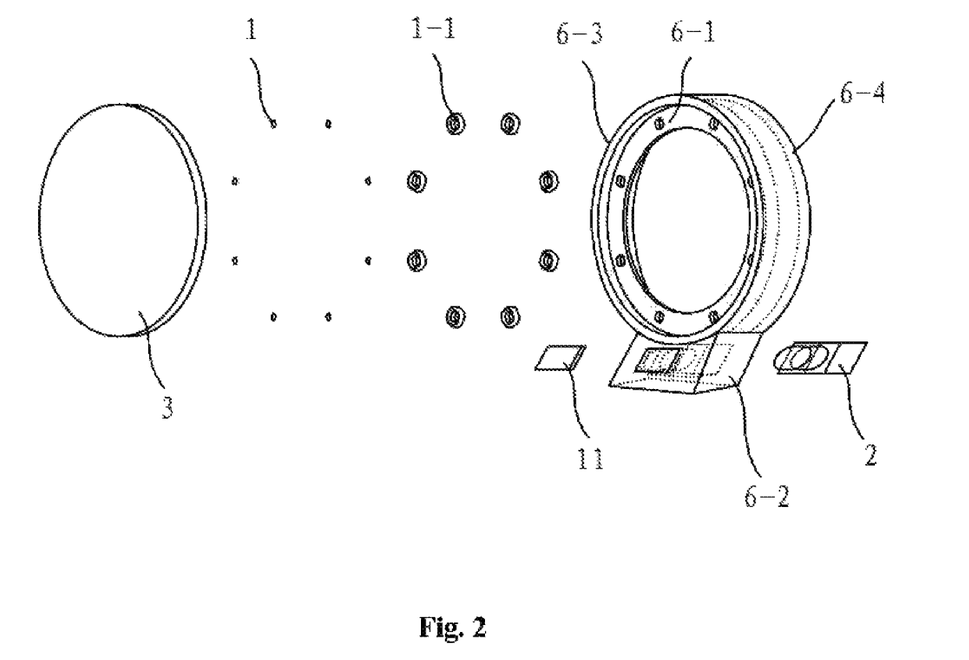
FIG. 2 is a schematic diagram of an exploded state of a single-eye tracking module provided by an embodiment of the present disclosure.
Figure 3:
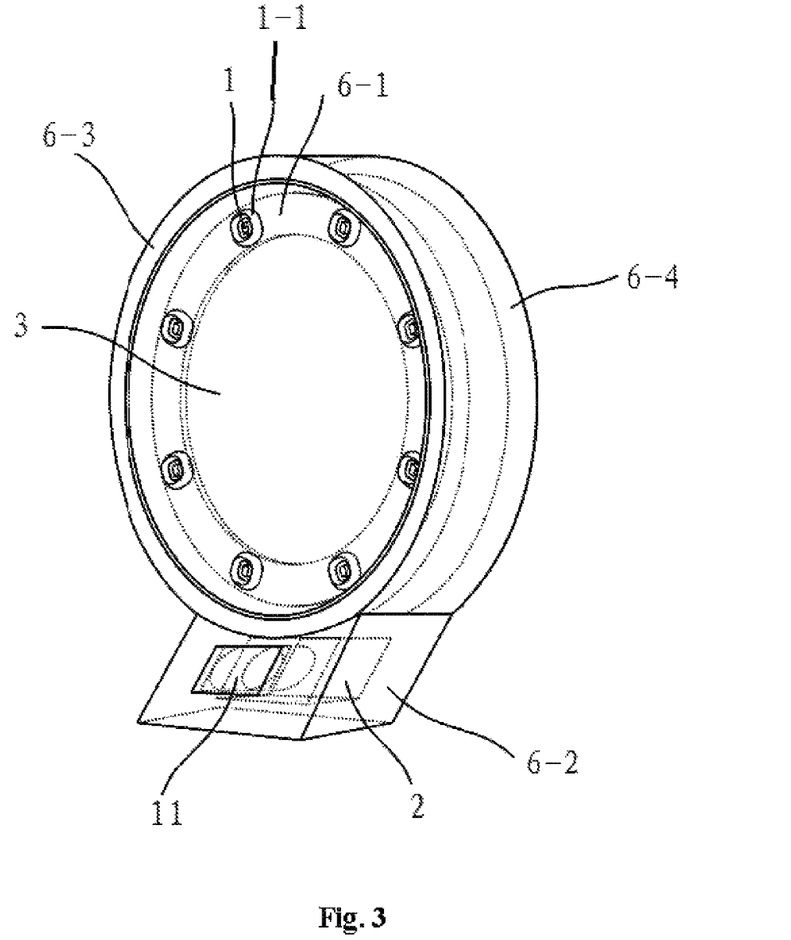
FIG. 3 is a schematic diagram from a first perspective of an assembly state of a single-eye tracking module provided by an embodiment of the present disclosure.
Figure 4:
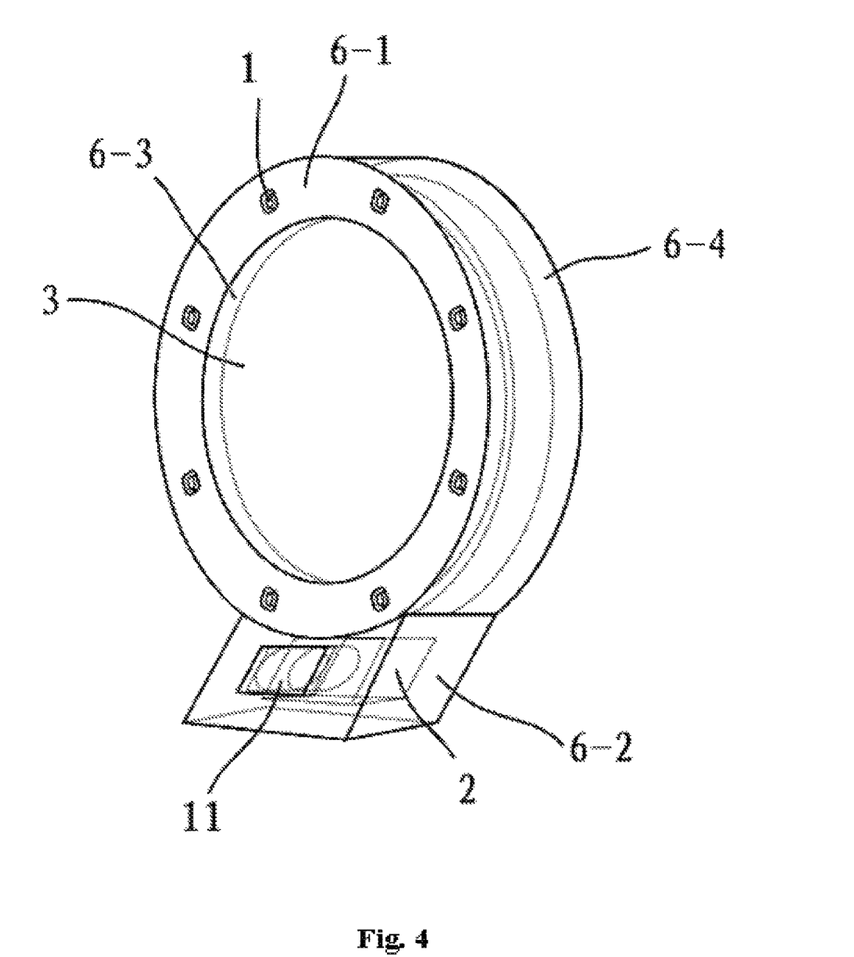
FIG. 4 is a schematic diagram from a second perspective of an assembly state of a single-eye tracking module provided by an embodiment of the present disclosure.
Figure 5:
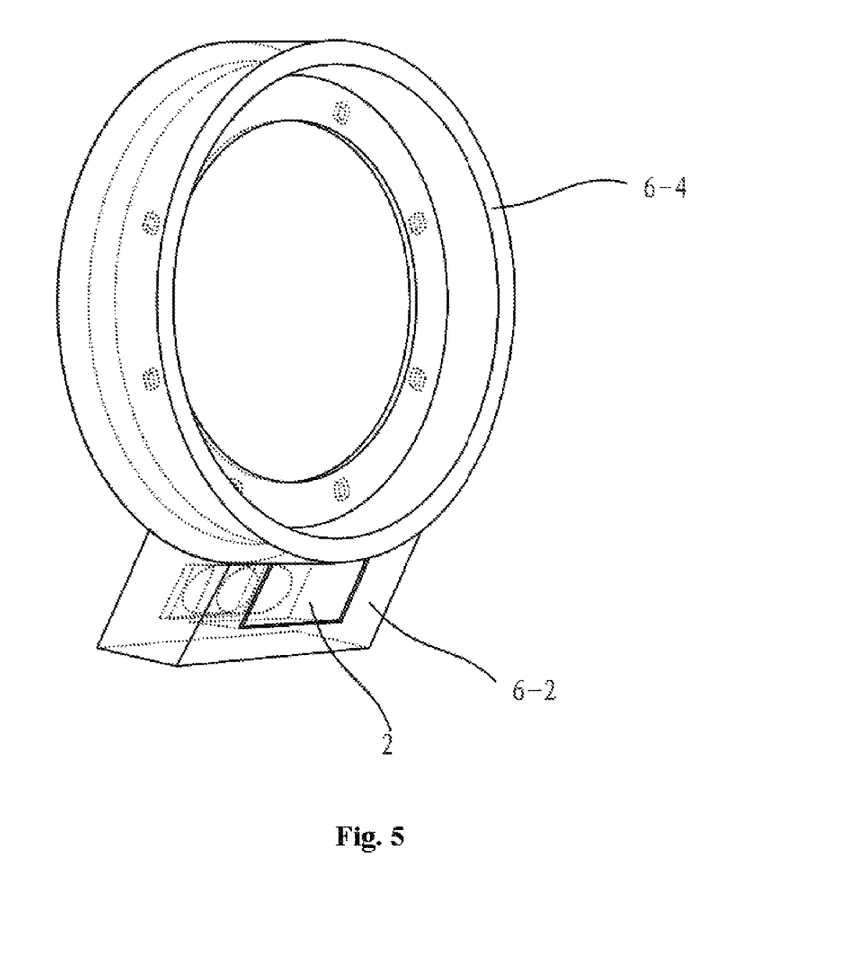
FIG. 5 is a schematic diagram from a third perspective of an assembly state of a single-eye tracking module provided by an embodiment of the present disclosure.

The image sensor assembly 6 is provided with fixing members. As shown in FIG. 3 to FIG. 5, a setting manner of each fixing member is described. The fixing members include an infrared light source fixing member 6-1, an image sensor assembly fixing member 6-2 and a connector 6-4.

The infrared light source fixing member 6-1 is configured to fix the infrared light sources on the tracking module housing 6. The image sensor assembly fixing member 6-2 is configured to fix the image sensor assembly 2 on the tracking module housing 6. The connector 6-4 is configured to fix the eye tracking module on a video glasses housing 8.

The infrared light source fixing member 6-1 and the image sensor assembly fixing member 6-2 are in detachably fixed connection or non-detachably fixed connection with the tracking module housing 6; and the connector 6-4 is in detachably fixed connection with the tracking module housing 6. In an actual application, the detachably fixed connection is threaded connection or pin connection or elastically deformed connection or lock catch connection or plug-in connection; and the non-detachably fixed connection is welding or bonding or riveting.

The eye tracking module for the video glasses provided by the present disclosure has the following main innovative points.

(1) The tracking module housing 6 is provided with the fixing members, and the infrared light sources and the image sensor assembly are installed via the fixing members, so the eye tracking module has the advantage of easy assembly.

(2) For virtual reality glasses on a present market, in most cases, a display terminal is directly disposed at a rear end of the ocular lens, and a lens of the image sensor assembly is disposed at the rear end of the ocular lens. With such an arrangement, a user may observe the lens of the image sensor assembly and the user is affected to normally watch information on a display screen. In the present disclosure, as shown in figures, the image sensor assembly is installed in the lateral frontal region of the eye and is located at the edge or the outside of the visual angle of the video glasses, so that the user is not affected to normally watch the information on the display screen in eye tracking.

In addition, in the related technology, an infrared cut-off light filter device is disposed in a region between the ocular lens of the video glasses and the display screen, so near-infrared light rays reflected by the eye are refracted by the ocular lens 5 of the video glasses, then are reflected by the infrared cut-off light filter device and at last are imaged to the image sensor assembly.

In the present disclosure, the infrared cut-off light filter device turns out to be unnecessary, and near-infrared light rays reflected by the eye are directly reflected to the image sensor assembly. In this sense, stray light generated by the reflection of the infrared cut-off light filter device is prevented, and the adverse effect on the image due to refraction of a Fresnel lens (the ocular lens 5 of some video glasses is the Fresnel lens) groove is further prevented. Therefore, the quality of the image collected by the image sensor assembly 2 of the present disclosure is higher, and the eye tracking precision is improved.

(3) In addition, each fixing member preferably is in detachably fixed connection with the tracking module housing, so the user may flexibly select whether to install a corresponding component or not according to an actual requirement, and thus the eye tracking module has the advantage of flexibility in use.

In a practical application, on the basis of the above structure, the following improvements may be further performed.

Improvement 1: lens fixing member and lens

The fixing members further include a lens fixing member 6-3, configured to fix a lens 3 on the tracking module housing 6; and the lens fixing member 6-3 is in detachably fixed connection or non-detachably fixed connection with the tracking module housing 6. Herein, the detachably fixed connection is threaded connection or pin connection or elastically deformed connection or lock catch connection or plug-in connection; and the non-detachably fixed connection is welding or bonding or riveting.

For the lens fixing member, the user may select whether to install the lens fixing member or not and whether to install the lens or not according to an own actual requirement.

The eye tracking module further includes the lens 3; and an outer edge of the lens 3 is located at the edge or the outside of the visual angle of the video glasses. For a wearer having a vision problem, the lens 3 may be a vision correction lens such as a convex lens or a concave lens; the specific thickness and type may be determined by a vision condition of the user, thereby assisting adjustment of a focal distance and thus the wearer having the vision problem can see the image clearly. FIG. 6 is a schematic diagram of an imaging light path when a concave lens is adopted by a lens in a single-eye tracking module provided by the present disclosure. FIG. 7 is a schematic diagram of an imaging light path when a convex lens is adopted by a lens in a single-eye tracking module provided by the present disclosure. Besides, for a wearer having a normal vision, the lens may not be placed at all, and alternatively, a parallel flat plate may also be placed. A film such as a reflection film may be coated on a surface of the parallel flat plate, so that the effect of protecting the vision is implemented.

In other words, in the present disclosure, the lens 3 is a selectable component, and a specific selected type is set flexibly according to the requirement of the wearer.

In FIG. 6 and FIG. 7, the lens 3 is disposed on a transmission light path between the eye 7 and the infrared light sources 1, and an imaging light path of the eye tracking module is as follows.

(1) Infrared light emitted by the infrared light sources 1 is refracted by the lens 3 and then reaches to the eye 7; and the eye 7 reflects the infrared light.

Specifically, since a wavelength perceptible to human eyes is 380 nm-780 nm, in order not to affect people to normally watch the display terminal, the infrared light sources 1 are fundamentally selected from near-infrared light sources with low sensitivity and small hazard to the human eyes.

(2) The eye 7 reflects the infrared light; and the infrared light is filtered by the infrared light filter component 11 and then is imaged to the image sensor assembly.

Specifically, the lens 3 is fixedly disposed on a transmission light path between the eye 7 and the display screen 4. More specifically, the lens 3 is fixedly disposed on a transmission light path between the eye 7 and the infrared light sources 1. FIG. 3 is a schematic diagram of such an assembly position. Or, the lens 3 is fixedly disposed on a transmission light path between the infrared light sources 1 and the display screen 4. FIG. 4 is a schematic diagram of such an assembly position. In other words, the infrared light may pass through the lens 3 and may also not pass through the lens 3.

In addition, an antireflection coating is plated on a side and a surface of the lens 3, and is configured to eliminate stray light.

Improvement 2: infrared light source

Each of the infrared light sources 1 is disposed in front of an ocular lens 5 of the video glasses. A lampshade 1-1 is further disposed around the infrared light sources 1. The infrared light source fixing member 6-1 and/or the lampshade 1-1 are made of a light-tight material, and are configured to limit a range of an irradiation angle of each of the infrared light sources 1 to be not smaller than 10° and not greater than 180°, and prevent a light emitted by the infrared light sources 1 from reflecting or directly irradiating to the ocular lens 5 to generate the stray light.

Improvement 3: infrared light filter component

The infrared light filter component 11 is integrated to an inside or a surface of the image sensor assembly 2; or, the tracking module housing 6 is further provided with an infrared light filter component fixing member; and the infrared light filter component 11 is fixed on the tracking module housing 6 via the infrared light filter component fixing member.

Improvement 4: a master control unit 9 and an intelligent device 10 are further included.

The intelligent device may be a terminal device such as a mobile phone, a tablet computer, a computer and intelligent glasses. The master control unit 9 is respectively connected with the infrared light sources 1, the image sensor assembly and the intelligent device 10.

It is to be noted that the master control unit 9 related in the present disclosure may be an independent master control circuit board, and may also be integrated to the intelligent device 10.

The master control unit 9 is configured to control an opening-closing state of each of the infrared light sources 1, and is further configured to receive an image collected by the image sensor assembly 2 and transmit the image to the intelligent device 10.

The eye tracking module for the video glasses provided by the present disclosure has the following advantages.

The eye tracking module has the advantages of simple structure, small occupied space, high eye tracking precision, flexible assembly and convenience in use.

The above is only preferable embodiments of the present disclosure, it is to be noted that about those of ordinary skill in the art, under the precondition without departing from the principle of the present disclosure, a plurality of improvements and modifications may be performed, and the improvements and modifications are also included within the scope of protection of the present disclosure.

What is claimed is:

1. An eye tracking module for video glasses, comprising: at least two infrared light sources, at least one image sensor assembly, an infrared light filter and a tracking module housing,
   wherein the infrared light sources are fixedly arranged in a lateral frontal region of an eye, are located at an edge or an outside of a visual angle of the video glasses, and are configured to emit infrared light to the eye, and the eye reflects the infrared light so as to form an eye reflection light path;

the image sensor assembly is fixedly arranged in the lateral frontal region of the eye and is located at the edge or the outside of the visual angle of the video glasses; and the image sensor assembly is disposed on the eye reflection light path and is configured to directly collect an eye image;

the infrared light filter component is disposed on a transmission light path between the image sensor assembly and the eye;

fixing members are provided on the tracking module housing, and comprise an infrared light source fixing member, an image sensor assembly fixing member and a connector;

the infrared light source fixing member is configured to fix the infrared light sources on the tracking module housing;

the image sensor assembly fixing member is configured to fix the image sensor assembly on the tracking module housing;

the connector is configured to fix the eye tracking module on a video glasses housing; and the infrared light source fixing member and the image sensor assembly fixing member are in detachably fixed connection or non-detachably fixed connection with the tracking module housing; and the connector is in detachably fixed connection with the tracking module housing;

a lampshade is further disposed around each of the infrared light sources, the infrared light source fixing member and/or the lampshade are made of a light-tight material, and are configured to limit a range of an irradiation angle of each of the infrared light sources to be not smaller than 10° and not greater than 180°, and prevent a light emitted by the infrared light sources from reflecting or directly irradiating to the ocular lens.

2. The eye tracking module for the video glasses as claimed in claim 1, wherein the fixing members further comprise a lens fixing member, configured to fix a lens on the tracking module housing; and the lens fixing member is in detachably fixed connection or non-detachably fixed connection with the tracking module housing.

3. The eye tracking module for the video glasses as claimed in claim 1, wherein the detachably fixed connection is threaded connection or pin connection or elastically deformed connection or lock catch connection or plug-in connection; and the non-detachably fixed connection is welding or bonding or riveting.

4. The eye tracking module for the video glasses as claimed in claim 1, further comprising a lens, wherein the lens is fixedly disposed between a transmission light path between the eye and a display screen; an outer edge of the lens is located at the edge or the outside of the visual angle of the video glasses; and the lens is configured to assist adjustment of a focal distance.

5. The eye tracking module for the video glasses as claimed in claim 4, wherein the lens is fixedly disposed on a transmission light path between the eye and the infrared light sources; or, the lens is fixedly disposed on a transmission light path between the infrared light sources and the display screen.

6. The eye tracking module for the video glasses as claimed in claim 4, wherein an antireflection coating is plated on a side and a surface of the lens, and is configured to eliminate stray light.

7. The eye tracking module for the video glasses as claimed in claim 4, wherein the lens is a vision correction lens.

8. The eye tracking module for the video glasses as claimed in claim 7, wherein the vision correction lens is a convex lens or a concave lens.

9. The eye tracking module for the video glasses as claimed in claim 1, wherein each of the infrared light sources is disposed in front of an ocular lens of the video glasses.

10. The eye tracking module for the video glasses as claimed in claim 1, wherein the infrared light filter component is integrated to an inside or a surface of the image sensor assembly;

or, the tracking module housing is further provided with an infrared light filter component fixing member, and the infrared light filter component is fixed on the tracking module housing via the infrared light filter component fixing member.

11. The eye tracking module for the video glasses as claimed in claim 2, wherein the detachably fixed connection is threaded connection or pin connection or elastically deformed connection or look catch connection or plug-in connection; and the non-detachably fixed connection is welding or bonding or riveting.

* * * * *